United States Patent [19]

Gururaja et al.

[11] Patent Number: 5,684,243
[45] Date of Patent: Nov. 4, 1997

[54] METHODS FOR CONTROLLING SENSITIVITY OF ELECTROSTRICTIVE TRANSDUCERS

[75] Inventors: Turuvekere R. Gururaja, North Andover; Darwin P. Adams, Lexington; Benjamin M. Herrick, Boxborough; David M. Prater, Melrose, all of Mass.

[73] Assignee: Hewlett-Packard Company, Palo Alto, Calif.

[21] Appl. No.: 712,015

[22] Filed: Sep. 11, 1996

Related U.S. Application Data

[62] Division of Ser. No. 332,287, Oct. 31, 1994, Pat. No. 5,585,546.

[51] Int. Cl.$^6$ ............................................. G01N 29/22
[52] U.S. Cl. ........................................... 73/1 DV; 324/601
[58] Field of Search ........................... 73/1 DV; 324/601; 128/660.01, 662.03

[56] References Cited

U.S. PATENT DOCUMENTS

| | | | |
|---|---|---|---|
| 4,039,999 | 8/1977 | Weston | 367/132 |
| 4,445,064 | 4/1984 | Bullis | 310/316 |
| 4,509,193 | 4/1985 | Carlson | 381/113 |
| 4,821,706 | 4/1989 | Schleicher et al. | 128/660 |
| 4,868,476 | 9/1989 | Respaut | 318/632 |
| 4,954,960 | 9/1990 | Lo et al. | 364/484 |
| 4,973,876 | 11/1990 | Roberts | 310/316 |
| 5,060,651 | 10/1991 | Kondo et al. | 128/660.07 |
| 5,113,706 | 5/1992 | Pittaro | 73/626 |
| 5,233,994 | 8/1993 | Shmulewitz | 128/661.08 |
| 5,297,436 | 3/1994 | Chan et al. | 73/657 |
| 5,370,121 | 12/1994 | Reichenberger et al. | 128/660.02 |
| 5,469,510 | 11/1995 | Blind et al. | 381/55 |

FOREIGN PATENT DOCUMENTS

| | | |
|---|---|---|
| 2946154 A1 | 6/1981 | Germany . |
| 3317045 A1 | 11/1984 | Germany . |
| 3625149 A1 | 2/1988 | Germany . |
| 4013607 A1 | 10/1991 | Germany . |
| 4307669 C2 | 9/1994 | Germany . |

*Primary Examiner*—Thomas P. Noland

[57] ABSTRACT

Apparatus and methods for controlling electrostrictive transducer sensitivity in a pulse-echo medical ultrasound system. Certain characteristics of each transducer element are tested after manufacture and recorded on a storage medium. The stored data is then used, along with certain model relations, for monitoring certain operational parameters of the transducer during use, and feedback compensation applied for maintaining the transducer sensitivity substantially constant. The parameters to be monitored may include the temperature, acoustic pressure, input power, and a figure of merit determined from the dielectric constant and coupling coefficient.

5 Claims, 9 Drawing Sheets

METHODS FOR CONTROLLING SENSITIVITY OF ELECTROSTRICTIVE TRANSDUCERS

CROSS REFERENCE TO RELATED APPLICATION

This is a divisional of application Ser. No. 08/332,287 filed on Oct. 31, 1994 and now U.S. Pat. No. 5,585,546.

FIELD OF THE INVENTION

The present invention relates to apparatus and methods utilizing feedback compensation for controlling the sensitivity of electrostrictive transducers.

BACKGROUND OF THE INVENTION

In the medical diagnostic field, transducers are typically arranged into arrays for use in an ultrasonic imaging system. For example, FIG. 1 shows an ultrasonic imaging system 100 in which an electrical stimulus 102, such as a pulse, is provided to an array of transducers 101, causing the transducers to transmit an ultrasonic acoustical wave 103. The ultrasonic wave is transmitted into the human body and eventually at least partially reflected by an object in the body, for example the heart 115. The reflected wave ("echo") is received by the transducer array 101 which produces an electrical current 104 that is indicative of the echo. Various properties of signal 104, such as its amplitude and phase, are then analyzed by signal processing to determine information about the object, such as its size, location, and velocity. See for example U.S. Pat. No. 5,060,651 entitled "Ultrasonic Diagnostic Apparatus."

More specifically, FIG. 1 shows a microprocessor 108 for controlling each of a transmitter 107, preamplifier 109, beam former 106, and digital scan converter 111. The echo signal 104 from transducer array 101 is sent to the preamplifier 109 and then in series to beam former 106, signal processor 105, A/D converter 110, and digital scan converter 111. The z-component of the echo signal is sent to post processor 112, and the resulting z-intensity is displayed on CRT screen 114. The x-y component is sent via x-y raster 113 and displayed on CRT screen 114. Any number of different transmitting and imaging processing system may be used.

Acoustic imaging transducers are generally made of piezoelectric materials, such as lead zirconate titanate (PZT) ceramic. They may also be formed of "composites", in which a piezoelectric ceramic and a polymer are combined for an improved range of properties.

Acoustic imaging transducers have also been made of electrostrictive materials, which are highly polarizable by the application of a DC bias voltage. Lead magnesium niobate-lead titanate (PMN-PT) is one example of an electrostrictive ceramic.

Both piezoelectric and electrostrictive transducer elements may be characterized by their pulse/echo response sensitivity. "Sensitivity," generally refers to how efficiently energy is transmitted (output) for a given input. "Pulse/echo response" refers to the transducer's capability of converting electrical energy into acoustical energy, and emitted acoustic energy back to electrical energy; it thus combines both the transmit and receive efficiencies. It is defined by the electrical pulse stimulus as an input, and acoustical energy as an output.

The pulse/echo response sensitivity of an electrostrictive transducer depends on various material properties, such as the relative dielectric constant K and the coupling coefficient $k_r$. These properties are a non-linear function of the operating temperature, the DC bias voltage, and the frequency of operation. See, for example Takeuchi et al., "Relaxor Ferroelectrio Transducers," Central Research Laboratory, Hitachi, Ltd. (1991). In addition, these properties may vary because of inherent variances in the starting material and/or the processing conditions. As such, the sensitivity may fluctuate for various reasons, some of which may be difficult to control.

The Federal Drug Administration (FDA) regulates the amount of acoustic energy that may be transmitted into a human body. If the sensitivity of a transducer varies, an excessive amount of energy may be transmitted. Moreover, systems which allow their input/output relationship to vary substantially are often perceived in the marketplace as being of inferior quality.

To date, the prior art has driven acoustic piezoelectric transducers with an open control loop. Thus, the prior art system would electrically stimulate the transducer, but not monitor the sensitivity to detect variations in sensitivity.

In summary, there is a need for apparatus and methods for controlling the sensitivity of transducer elements.

SUMMARY OF THE INVENTION

The present invention is directed to an apparatus and method for controlling electrostrictive transducer sensitivity. More specifically, certain characteristics of each transducer element are tested after manufacture and then recorded on a storage medium, such as burning on an EPROM. The stored data is then used, along with certain model relations, for monitoring certain operational parameters of the transducer during use, and feedback compensation applied for maintaining the transducer sensitivity substantially constant.

More specifically, the EPROM data may consist of measured data of sensitivity versus bias voltage at a predetermined operating temperature. Then, in use, the element is subjected to a system control which adjusts either or both of the transmit level or the bias level to obtain a desired and consistent acoustical output level.

In one embodiment, temperature feedback compensation is additionally provided wherein a temperature sensor is disposed adjacent the transducer element. A model relation is provided defining the sensitivity of the material element class versus bias, over a range of temperatures. Then, the system control adjusts either the transmit level and/or the bias voltage to achieve the desired acoustic output based upon the EPROM data for the specific element, the model relation, and the temperature signal from the temperature sensor.

In another embodiment, a pressure sensor is used instead of a temperature sensor. The apparatus and method are substantially the same, but in this case the model relation defines the sensitivity of the transducer assembly versus the pressure sensor output level. The system control adjusts the transmit level and/or bias to achieve a desired acoustic output based upon the EPROM data, model relation and pressure sensor output level.

In yet another embodiment, a figure of merit feedback compensation is provided. An EPROM defines the sensitivity of the array versus bias voltage. A model relates the sensitivity to the dielectric constant (K) and coupling coefficient ($k_r$) for the class of transducer material. The system control adjusts the transmit level and/or bias to achieve the desired acoustic output based upon the EPROM; model relation, and K and $k_r$ values. The measurements may be taken either from the operating (functional) element, or from a reference element in the same array.

In a further alternative embodiment, the feedback compensation is based on the input power to the transducer element. The model relation defines the input power into the element to achieve a desired acoustic output. The system control adjusts the transmit level and/or bias voltage to achieve a desired acoustic output based upon measurements of the input current and voltage.

Various apparatus and methods for measuring and determining the element capacitance, dielectric constant, and coupling coefficient are described.

These and other advantages of the present invention will be more specifically described in the following detailed description and drawings.

DETAILED DESCRIPTION

Figure 2:
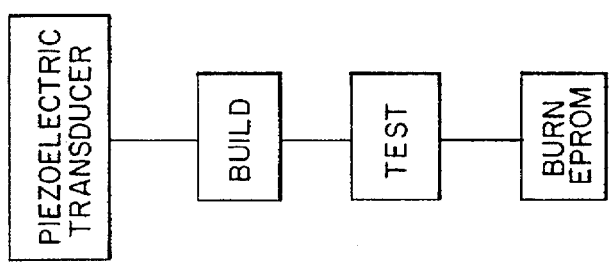
FIG. 2 is a block diagram showing a prior art method for building, testing, and recording on an EPROM, data concerning a piezoelectric transducer.
Figure 4:
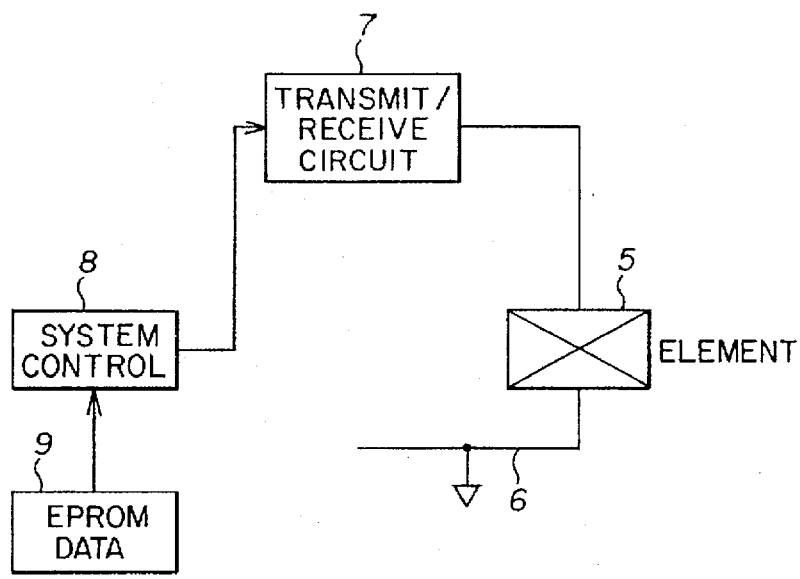
FIG. 4 is a schematic diagram of a prior art circuit with system control for adjusting the output of a piezoelectric transducer element.

In a prior art system, illustrated in FIGS. 2 and 4, a piezoelectric transducer is built, tested and certain data is recorded by burning an EPROM. The EPROM data may represent the sensitivity of this particular element.

In use, the piezoelectric element 5 is incorporated in an acoustic imaging system including a transmit/receive circuit 7. The EPROM data 9 for the element 5 is supplied to a system control 8, which is connected to the transmit/receive circuit 7 and adjusts the transmit level in an attempt to obtain a desired acoustic output 6 from element 5. However, this open loop system does not provide the necessary control for the reasons previously described.

Figure 1:
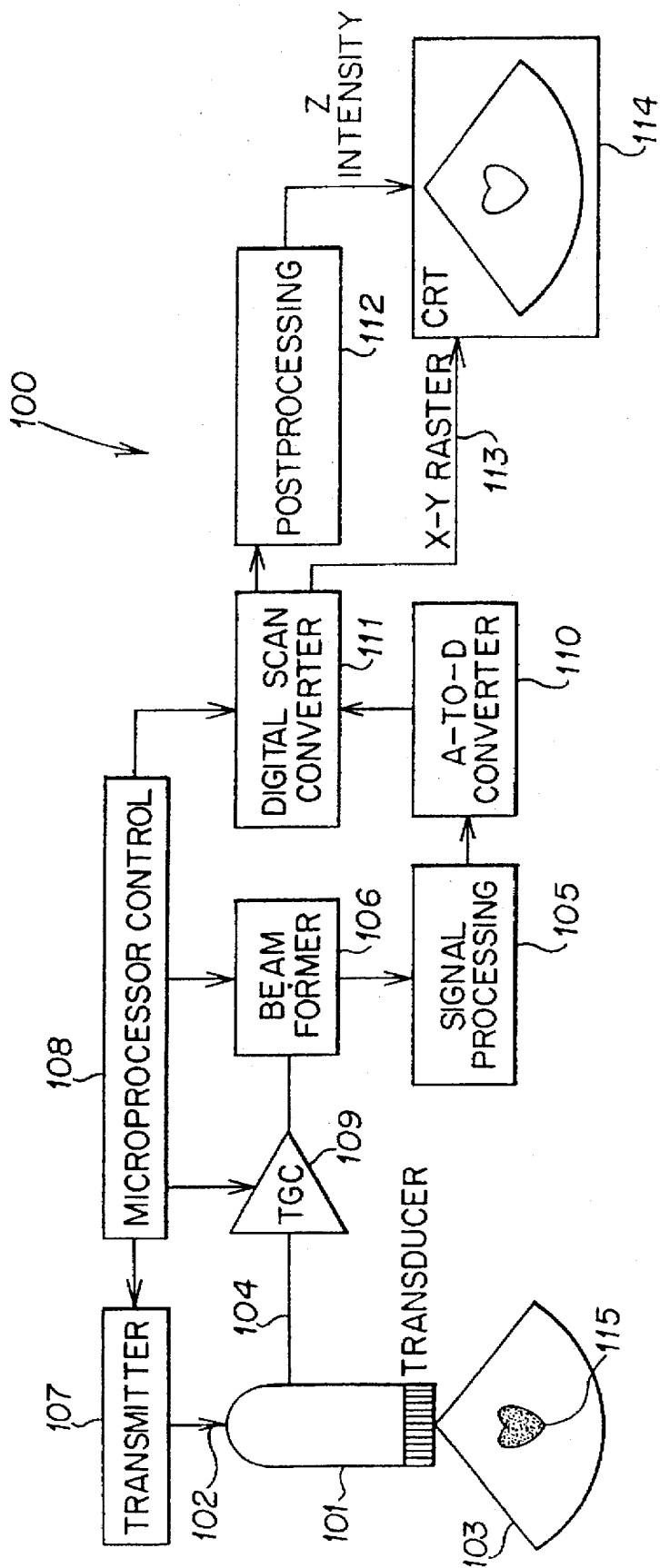
FIG. 1 is a block diagram of an ultrasound imaging system using a phased array.
Figure 3:
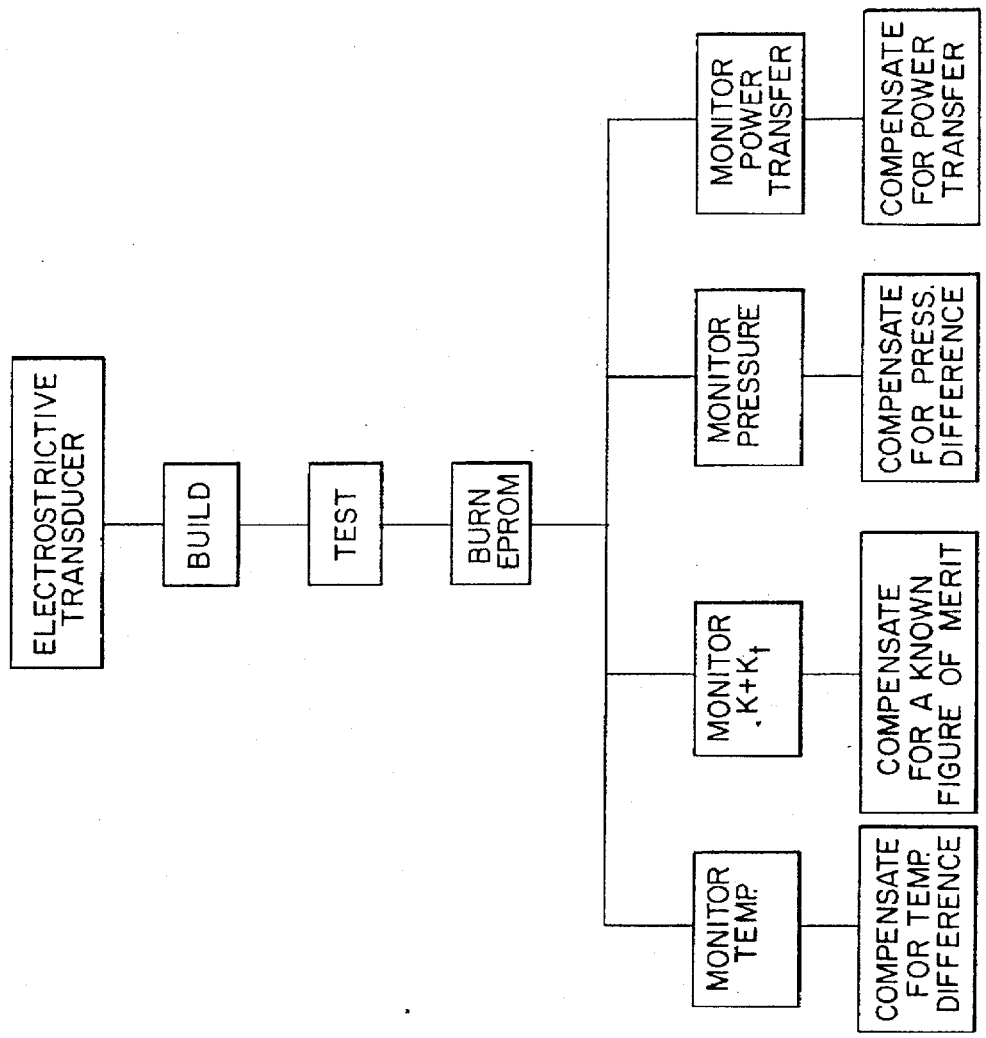
FIG. 3 is a block diagram illustrating the method of the present invention for testing and recording certain data concerning an electrostrictive transducer element, and for using such data in combination with the monitoring of certain operational parameters of the element and compensating for variations which may affect the sensitivity.
Figure 5:
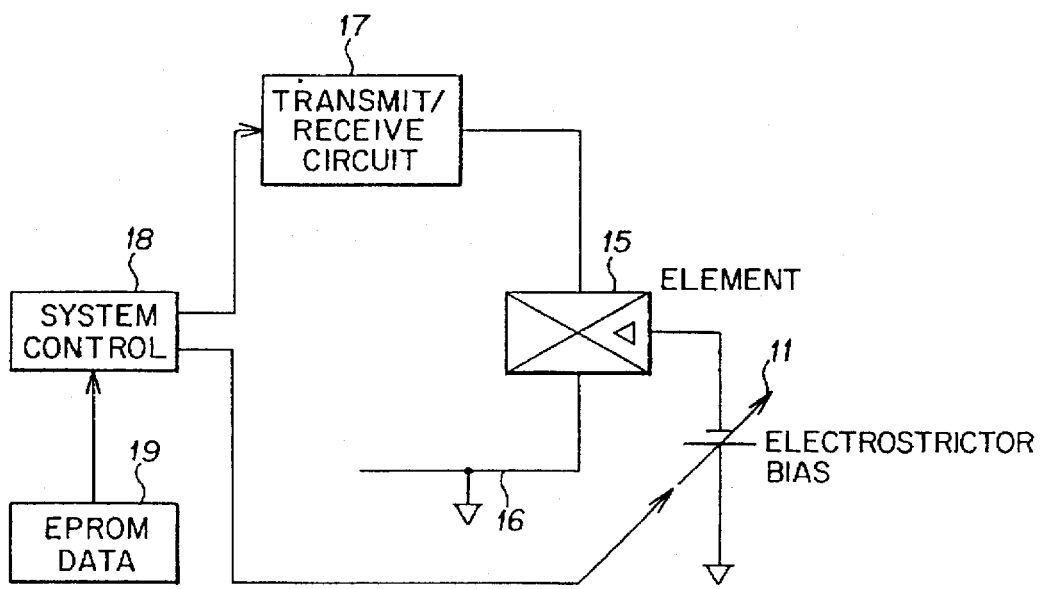
FIG. 5 is a schematic diagram of a circuit according to the present invention with system control for regulating the output of an electrostrictive transducer element by varying the bias voltage and/or transmit level.

In contrast, one embodiment of the method and apparatus of the present invention is illustrated in FIGS. 3 and 5. More specifically, an electrostrictive transducer element 15 is built, tested and measured data from the testing is recorded on a storage medium, such as by burning an EPROM 19. As shown in FIG. 5, the electrostrictive element 15 is incorporated in an operating circuit and provides an acoustical output 16. The element 15 is connected to a transmit/receive circuit 17, which in turn is connected to a system control 18. The element 15 is also connected to a bias voltage source 11.

The data provided on EPROM 19 consists of the element sensitivity versus the bias voltage at the designated operating temperature. The system control 18, which receives the EPROM data, then adjusts either or both of the transmit level out of circuit 17 and/or the bias level set by bias source 11, to obtain a desired and consistent acoustic output level 16.

Figure 6:
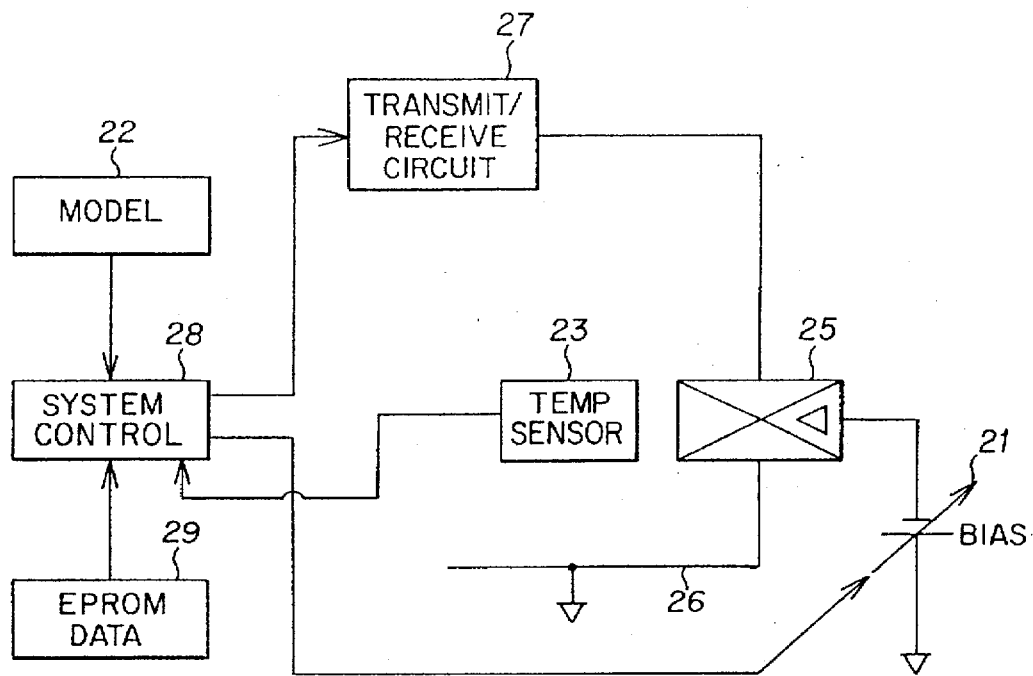
FIG. 6 is a schematic diagram of a circuit according to the present invention utilizing a temperature sensor for feedback compensation.

FIG. 6 shows a further embodiment of the present invention for providing temperature feedback compensation, in addition to the "static compensation" provided by the EPROM data and system control of FIG. 5. In FIG. 6, the operating circuit is arranged similar to the layout in FIG. 5 for ease of comparison, and similar elements have been given similar reference numerals by adding "10" thereto.

More specifically, temperature sensor 23 is positioned adjacent the operating or functional element 25. It is to be understood throughout the specification, that the transducer "element" may refer to a single transducer or an array of transducers. EPROM data 29, for the specific element 25, defines the measured sensitivity versus bias at one operating temperature. The model relation 22 defines the sensitivity of the transducer material class versus bias, over a range of temperatures. The material class may be, for example, the material PMN-PT which is used for making the element 25. The EPROM data 29 and model relation 22 are both fed to system control 28, which also receives the output of temperature sensor 23 (i.e., the actual operating temperature of element 25). The system control then adjusts either the transmit/receive circuit 27 and/or the biasing source 21 in order to achieve a desired acoustic output from element 25. By thus measuring the actual temperature of operation, the EPROM data, which assumes a certain operating temperature, can be corrected when the actual operating temperature varies from the assumed temperature.

Figure 7:
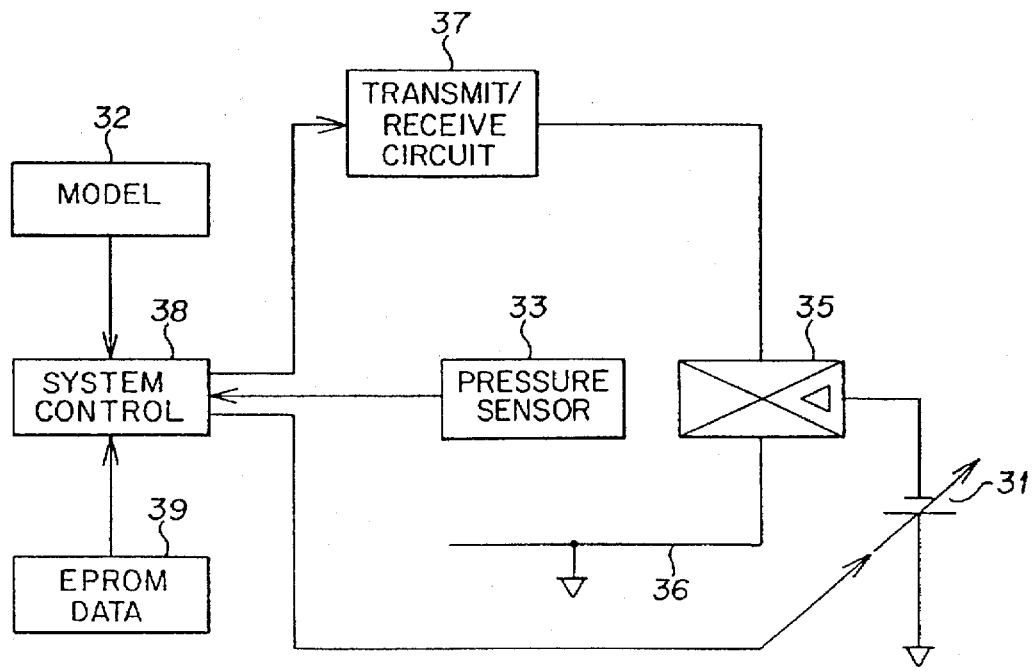
FIG. 7 is a schematic diagram of a circuit according to the present invention utilizing a pressure sensor for feedback compensation.

FIG. 7 shows a further embodiment, similar to FIG. 6, but in which the temperature sensor 23 of FIG. 6 has been replaced by a pressure sensor 33 in FIG. 7. Again, the operating circuit of FIG. 7 has been laid out similar to FIG. 6 for ease of comparison, and corresponding elements have been given similar reference numbers by adding "10"

In FIG. 7, the pressure sensor 33 measures the acoustic output pressure of electrostrictive element 35, and supplies the same to system control 38. Again, the EPROM data 39 defines the sensitivity versus bias, at one operating temperature. The model relation 32 defines the sensitivity of the transducer assembly (e.g., including backing material and matching layers) versus the pressure sensor output level. The system control 38, which receives the EPROM data, model relation and pressure sensor output, then adjusts either the transmit/receive circuit 37 and/or the biasing source 31 in order to achieve a desired acoustic output from element 35. This system, which measures the actual acoustic pressure output by element 35, is a very accurate method for controlling the pulse echo sensitivity, assuming good accuracy of the pressure sensor 33. Thus, it may be desirable to calibrate the pressure transducer.

Figure 8:
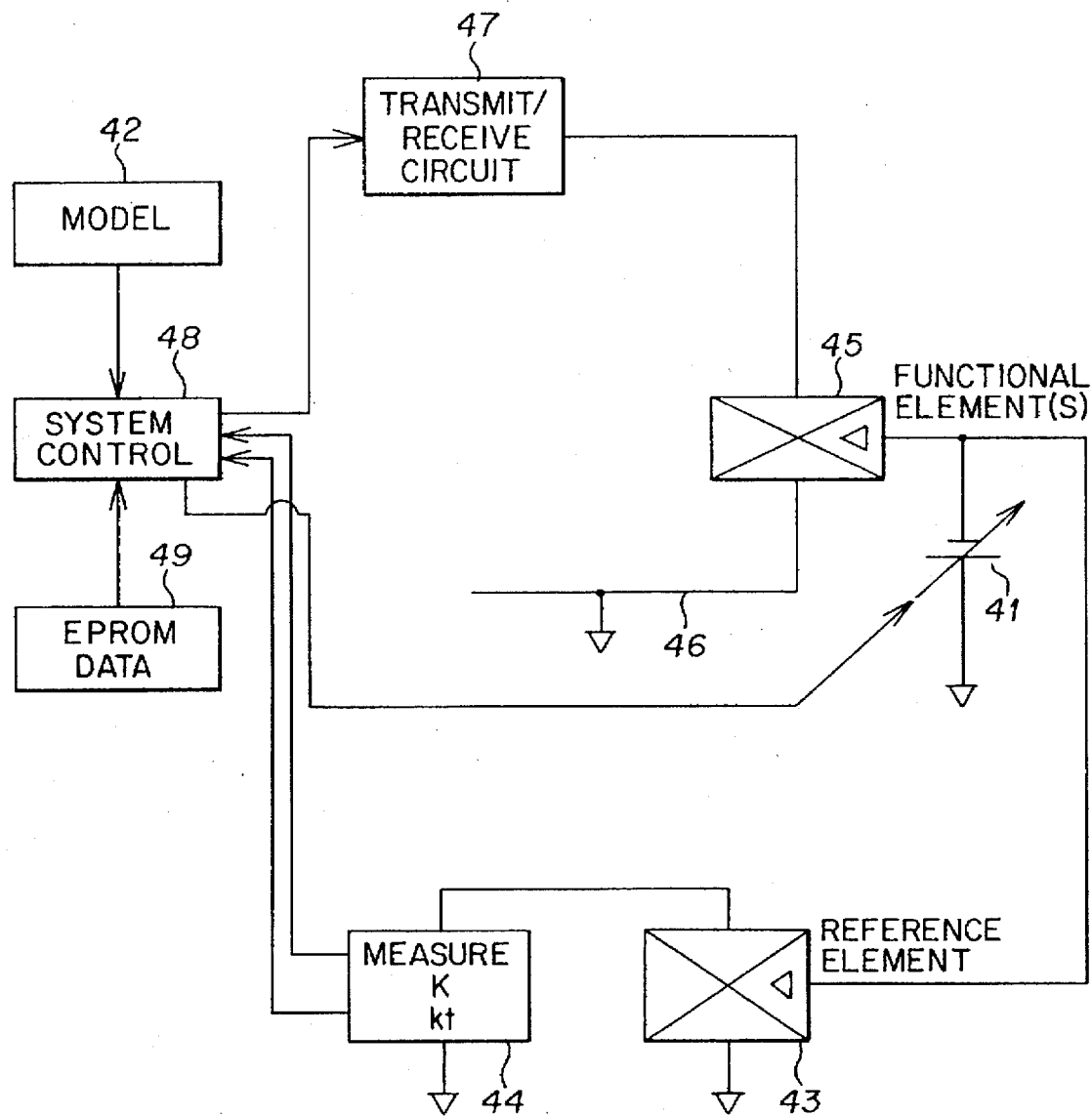
FIG. 8 is a schematic diagram of a circuit according to the present invention for measuring the dielectric constant and coupling coefficient and for providing feedback compensation.

FIG. 8 shows yet another embodiment in which a figure of merit feedback compensation is provided, and measurements are taken from a separate reference element. Again, the layout of FIG. 8 is similar to the previous circuits, for ease of reference, and corresponding elements have been given similar reference numerals by adding "10".

More specifically, FIG. 8 shows a first electrostrictive transducer element 45, which is the operating or functional element, and a second electrostrictive transducer element 43, presumably from the same array, which serves as the reference element. In this case, an apparatus 44 is provided for measuring the dielectric constant K and coupling coefficient $k_t$ of the reference element, which measurements are provided to the system control 48, along with the EPROM data 49 and model relation 42. The EPROM data consists of the sensitivity versus bias voltage for all elements of the array (presumed constant for the array) at one operating temperature. The model 42 relates the sensitivity to the dielectric constant and coupling coefficient for the class of electrostrictive materials used in the elements 45, 43. A system control then adjusts either the transmit/receive circuit 47 and/or the biasing source 41 to achieve a desired acoustic output 46. Apparatus for measuring the dielectric constant and coupling coefficient is described hereinafter with respect to FIGS. 11-12.

A figure of merit which may be used for model 42 is described in J. Callerame et al., "Transmitters And Receivers For Medical Ultrasonics," 1979 Ultrasonics Symposium, IEEE (1979), pages 407–411. For example, the Callerame article describes two parameters, TP and RP, which give a measure of the transmitter and receiver response, respectively. The parameter TP, defined below, is strictly valid only at frequencies much less than the resonance frequency of the transducer, but is also a good indication of transmit efficiency near resonance if the transducer is operated in a broadband mode:

$$TP = \frac{k_t}{1-k_t^2} \sqrt{\frac{\epsilon_{33}^S}{c_{33}^D}}$$

where $k_t$ is the thickness mode coupling constant, $\epsilon_{33}^S$ is the dielectric constant at constant strain and $c_{33}^D$ is the elastic stiffness constant A good estimate of the relative receiver sentivity, which is valid far off resonance, is defined by the open circuit receiver sensitivity parameter RP given by:

$$RP = \frac{k_t t}{\sqrt{c_{33}^D \epsilon_{33}^S}}$$

where t is the transducer thickness.

Figure 9:
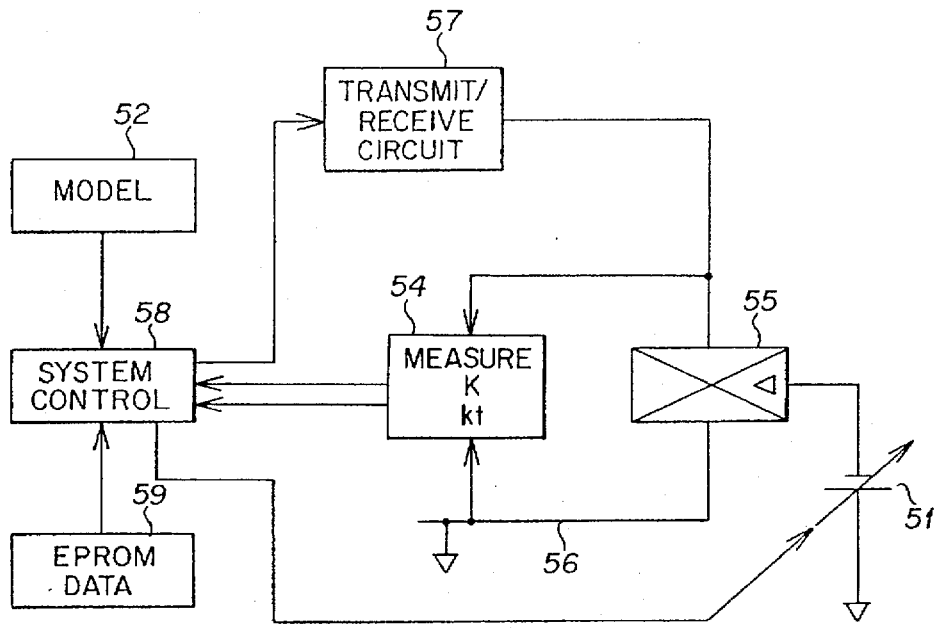
FIG. 9 is a schematic diagram similar to FIG. 8, but wherein the measurements are made on the operating (functional) element, as opposed to a reference element as in FIG. 8.

FIG. 9 is similar in all respects to FIG. 8 except the measurements of dielectric constant and coupling coefficient are made with respect to the functional element, as opposed to a reference element. As shown, an apparatus 54 is provided for measuring K and $k_t$ of functional element 55. The system control 58 receives the EPROM data 59, model relation 52, and measurements of K and $k_t$. The system control adjusts the output of transmit/receive circuit 57 and/or the biasing source 51 in order to achieve a desired acoustic output 56 from element 55.

Figure 10:
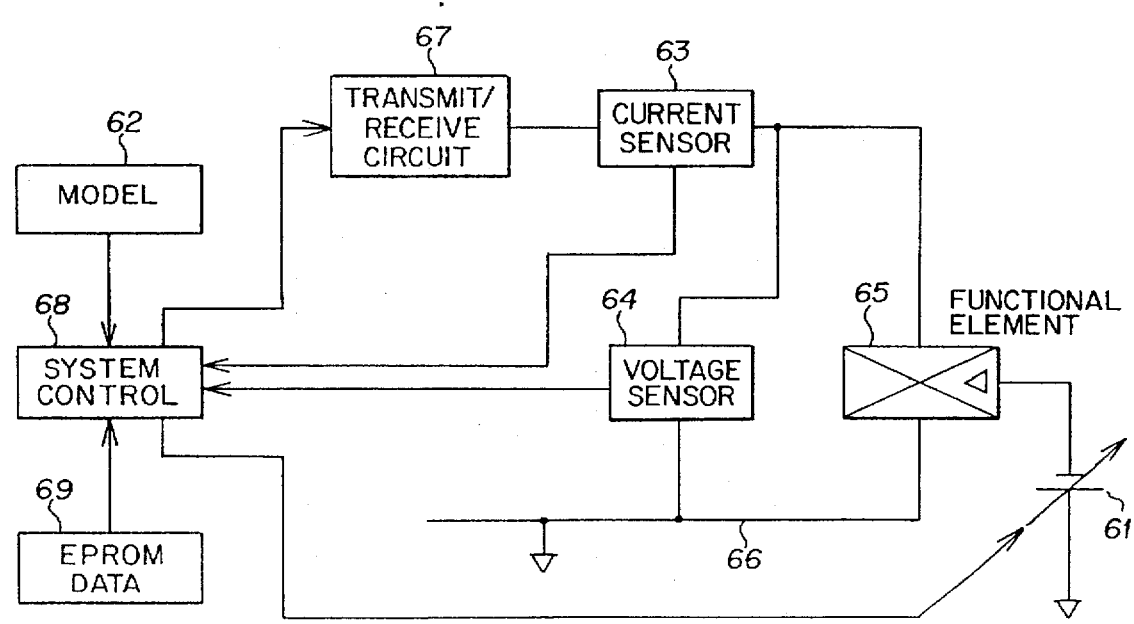
FIG. 10 is a schematic diagram of a circuit according to the present invention utilizing current and voltage sensors for determining the input power and providing feedback compensation.

FIG. 10 Shows a final embodiment for providing input power feedback compensation. Again, the operating circuit has been laid out similar to the prior circuits for ease of reference, and corresponding reference numbers have been given similar numbers by adding "10".

In FIG. 10, a current sensor 63 and voltage sensor 64 are provided in parallel with functional element 65 for determining the input power to element 65. The outputs of current sensor 63 and voltage sensor 64 are provided to system control 68, along with the EPROM data 69 and model relation 62. The EPROM data again is the sensitivity versus bias voltage for this element at one operating temperature. The model 62 defines the relation of the input power into the functional element to the acoustic output of that element. The system control adjusts either the transmit level out of the transmit/receive circuit 67 and/or the biasing level of source 61 to achieve a desired acoustic output 66. A more detailed description of an apparatus for determining the input power is described hereinafter with respect to FIG. 13.

Measuring the Capacitance of the Transducer During Operation to Determine K and $k_t$ The pulse/echo response of a transducer depends upon the electromechanical coupling constant $k_t$ and the relative dielectric constant K. This information may be determined from the geometry and the capacitance of the transducer. For example, if the transducer may be reasonably modeled as a parallel plate capacitor, the relative dielectric constant K may be determined with the following equation:

$$K = Cd/\epsilon_o A \quad (1)$$

where C is the capacitance, d is the thickness between the electrodes of the transducer, A is the area facing the electrodes, and $\epsilon_o$ is the permittivity of free space (8.854× $10^{-12}$ farads/meter). In turn, the electromechanical coupling constant $k_t$ may be determined with the following equation:

$$K^S = K^T(1-k_t^2) \quad (2)$$

where $K^S$ is the relative dielectric constant measured at a frequency above the operating frequency of the transducer, i.e., "a clamped capacitance" frequency, and $K^T$ is the relative dielectric constant measured at a frequency below the operating frequency, i.e., "an unclamped capacitance" frequency. These two frequencies should be sufficiently removed from the resonance frequency of the transducer so that there is no effect on the measured capacitance from resonance. Thus, by measuring the capacitance of the transducer element during operation, at both a clamped capacitance frequency and an unclamped capacitance frequency, the electromechanical coupling constant $k_t$ may be determined. As such, K and $k_t$ may then be used by, i.e., fed back to, a control system of the imaging system. In turn, the control system may vary the DC bias voltage accordingly. By varying the DC bias voltage, variances in the sensitivity of the transducer may be compensated for. For example, if the sensitivity varies such that the transducer is transmitting an increased amount of acoustical energy, the bias voltage may be decreased. In particular, if an electrostrictive transducer needs a bias voltage of 250V DC, the DC bias circuit may need to vary the voltage±25V DC. A response time for changing the bias voltage of approximately ½ second should be sufficient, because the sensitivity will not fluctuate that rapidly.

Figure 11:
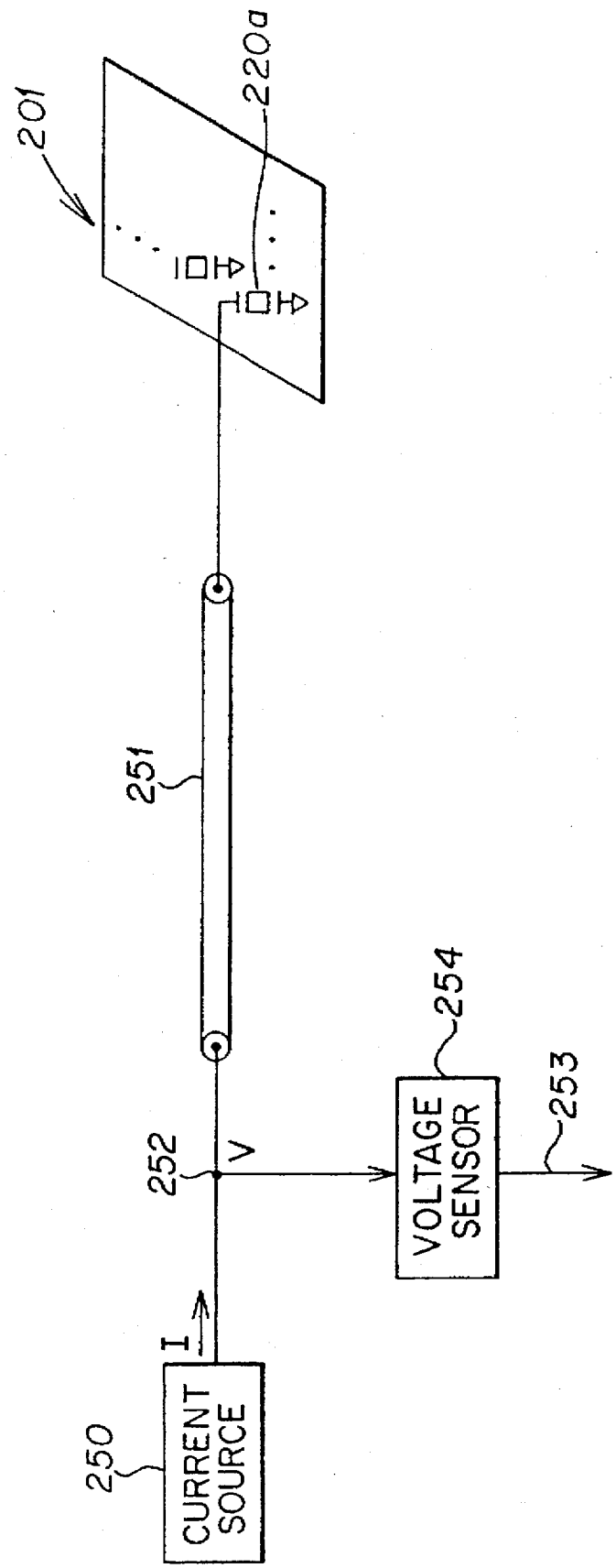
FIG. 11 is a schematic diagram of a circuit for measuring the capacitance of a transducer element during operation to determine the coupling coefficient.

Referring to FIG. 11, transducer element 220a is one element from an array 201 of such elements. In this embodiment, element 220a is dedicated to control purposes. As such, the other elements of the array, i.e., the ones used for imaging, will not affect the sensing operation needed for control measurements. Likewise, signals that are applied to the dedicated control element 220a will not affect the imaging elements. Alternatively, transducer element 220a may be used for imaging. As such, measuring various properties of element 220a will provide information about an element actually used for imaging. Preferably, the element 220a has its properties measured when the scanner of the imaging system is idle, i.e., when the array of elements are not being used for imaging.

To measure the so-called "unclamped capacitance," a low frequency current source 250 transmits a known signal, for example, a sine wave of 1000 Hz, on cable 251, which connects the transducer element 220a to the measurement apparatus described below. The resulting voltage measured at node 252 depends upon the frequency, i.e., 1000 Hz, and the total capacitance of the load ("$C_{load}$"). $C_{load}$ is the capacitance of the cable 251 and the transducer element 220a. The voltage ("V") at node 252 is related to the known current ("I") and $C_{load}$ with the following equations:

$$V = \frac{I}{jwC_{load}}$$

$$\{j=(-1)^{1/2}\} \quad (3)$$

$$C_{load}=C_{cable}+C_{transducer} \quad (4)$$

Consequently, $C_{load}$ may be determined by taking the absolute value of the measured voltage (see voltage sensor 254) at node 253. Then, once $C_{load}$ is determined, $C_{transducer}$ may be solved with equation (4), because $C_{cable}$ is known in advance.

Because the sensitivity of the transducer is not expected to fluctuate at a high rate, the calculation of $C_{transducer}$ need not be done very quickly and very frequently. Thus, relatively low speed circuitry may be used. For example, the sensed voltage at node 252 may be digitized, with an analog-to-digital converter. The digitized voltage 253 may then be received by a microprocessor within the imaging system, which will then solve the equations (3) and (4).

Alternatively, the unclamped capacitance of transducer 220 may be determined by supplying a known DC current to the element and measuring the time ("t") it takes for the element to reach a specified voltage level ("V"). $C_{load}$ may then be determined with the following relation:

$$C_{load} = \frac{I*t}{V} \quad (3^*)$$

Then $C_{transducer}$ may be solved with equation (4).

Given $C_{transducer}$ at an unclamped capacitance frequency, $K^T$ may be solved by using the appropriate capacitance equation, such as equation (1) for parallel plate capacitors.

Many other simple capacitance measurements could be designed. These two are meant to be representative of the art.

The so-called "clamped capacitance" of the transducer is measured at a significantly higher frequency, so that the element will not move significantly in response to the applied signal. Under these circumstances, the element acts as if it were mechanically clamped and stores considerably less charge than a transducer at the unclamped frequency. For a transducer 220a having a resonant frequency of 5.0 MHz, a measurement occurring at 10 MHz or higher should be sufficient to determine the clamped capacitance. At these frequencies, however, the transducer's impedance will include a resistive component as well as a capacitive component. Moreover, the capacitive component, i.e., the reactance, will be relatively small, i.e., on the order of 10 or 20 ohms. Consequently, radio frequency measurement techniques are required.

Figure 12:
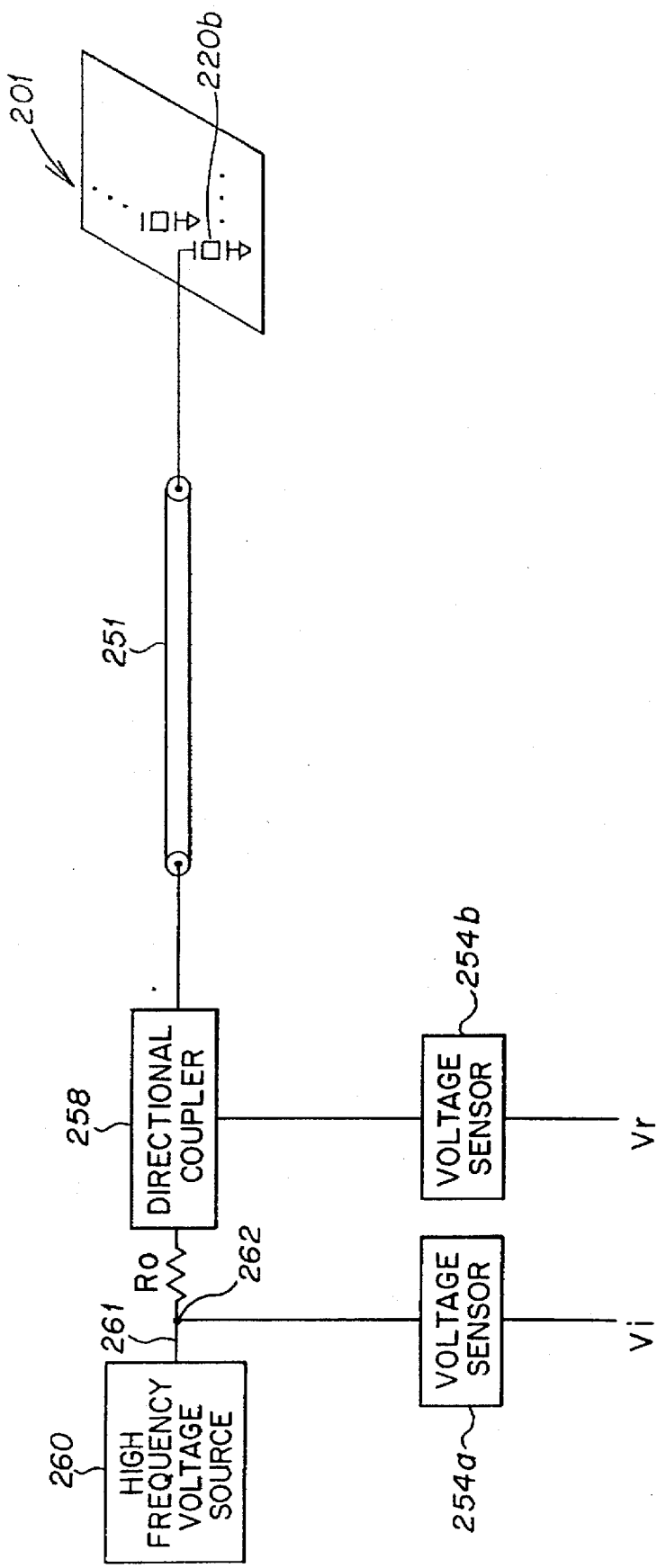
FIG. 12 is a schematic diagram of a circuit for measuring the clamped capacitance of a transducer element.

Referring to FIG. 12, a high frequency voltage source 260 supplies a known signal 261 to a directional coupler 258. This signal is often called an "incident signal." The coupler 258 separates the incident signal and a reflected signal. The incident signal is received by the coupler 258 and transmitted on the cable 251. The reflected signal (i.e., the echo) is received by the coupler 258 from the same cable 251, after the incident signal is partially reflected by element 220b. If the coupler 258, cable 251, current source 260 and resistor $R_o$ all have a nominal impedance of 50 ohms, any waveform reflected back to the coupler 258 is due to the transducer element 220b having a different impedance. (Element 220b is also a dedicated transducer element.) Consequently, the impedance of the transducer ("$Z_{transducer}$") may be determined with the following equation:

$$Z_{transducer} = Z_{cable} * \frac{(V_i + V_r)}{(V_i - V_r)} \quad (5)$$

where $V_i$, a complex voltage, is the incident signal voltage measured at node 262 by voltage sensor 254a; and $V_r$, also a complex voltage, is the voltage reflected from the transducer, and is provided to voltage sensor 254b from coupler 258.

Once $Z_{transducer}$ is known, its capacitive component may be determined, and, consequently, $K^S$ may be solved. Once $K^T$ and $K^S$ are known, the control system can control the sensitivity of the transducer by changing the bias voltage accordingly. The actual amount of delta in the bias voltage is expected to be on the order of ±25 V DC for a bias voltage of 250 V DC. However, these numbers will depend upon the materials actually used, because the non-linear relation between sensitivity and bias voltage will vary among electrostrictive materials. The adjusted bias voltage may then be applied to all transducers of the array 201.

Alternatively a single transducer element may be used. In this case, a person skilled in the art would know how to modify equations (3)–(5) to correspond to the modified connections in which the apparatus of FIGS. 11 and 12 are connected to one element, not two elements.

Measuring Input Power of Transducer (I)

Figure 13:
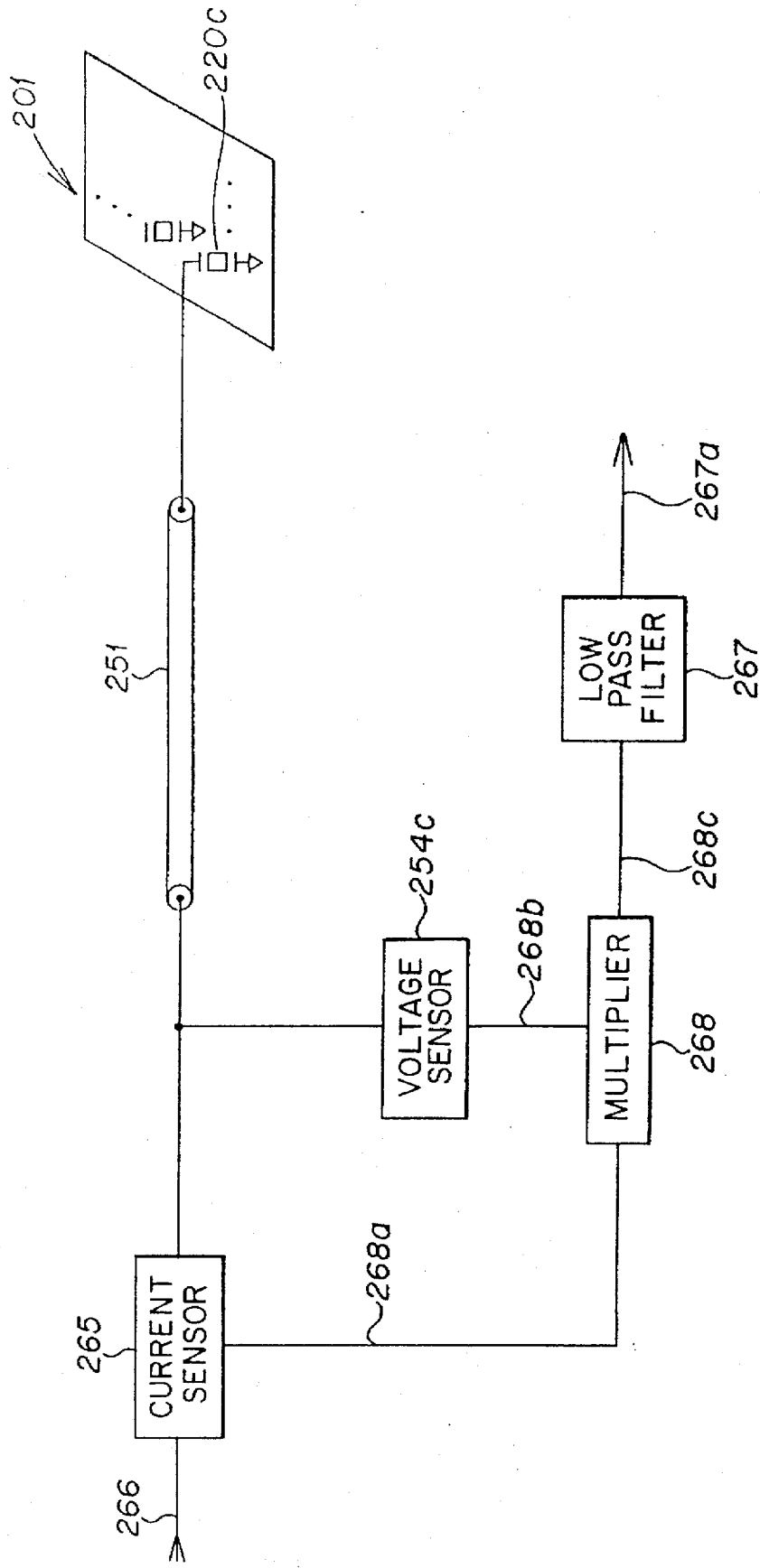
FIG. 13 is a schematic diagram of a circuit for measuring the output power of a transducer element.

Referring to FIG. 13, a specific embodiment for measuring the input power to the transducer is shown. Element 220c is an active element; that is, element 220c is used for imaging purposes. Line 266 is the standard receive and transmit channel of the imaging system, A current sensor 265, e.g., a transformer, receives and transmits to cable 251 the signal received on line 266. In addition, it also transmits on line 268a a signal indicative of the transmitted current. A voltage sensor 254c senses the voltage at which element 220c operates and transmits an indicative signal on line 268b. A multiplier 268 receives the signals on lines 268a and 268b and multiplies the two. Because power equals voltage multiplied by current, the multiplier determines the instantaneous value of the power transmitted to element 220c. An indicative signal of the instantaneous power is transmitted on line 268c, which is received by a low pass filter 267. The low pass filter performs an averaging operation of input signal in reference to time. The average power signal 267a may then be received by the control system, which can then monitor the power delivered to element 220c. Because the power delivered to element 220c is indicative of the sensitivity, the control system may then vary the DC bias voltage accordingly.

For example, if the operating conditions change so as to result in an increase in the power delivered to element 220c, the control system would recognize the increase in delivered power and compensate for it accordingly by biasing the array 201 at an adjusted level.

This embodiment offers the advantage of performing measurements at actual operating frequencies of the element 220c. A preferred embodiment performs the measurements when the element 220c is stimulated with a center frequency of the element, i.e., a resonant frequency.

Having thus described certain embodiments of the present invention, various modifications and improvements will readily occur to those skilled in the art. For example, another user may find it effective and lower the production cost by not measuring each transducer and storing the data in an EPROM. Accordingly, the foregoing description is by way of example only and the invention is defined as set forth in the following claims.

What is claimed is:

1. A method of controlling the sensitivity of an electrostrictive transducer element in a system that includes the transmit circuit and a bias voltage source, the method comprising the steps of:
   (a) monitoring the electrostrictive transducer element for operational parameters indicative of the-acoustic power generated by the transducer element; and
   (b) applying feedback compensation in response to the monitoring step.

2. The method of claim 1, wherein step (a) includes determining the capacitance of the transducer element at an unclamped capacitance frequency by sensing a first voltage that is indicative of the capacitance.

3. The method of claim 2, wherein step (a) includes determining a second capacitance of the transducer element at a clamped capacitance frequency by sensing a second voltage that is indicative of an incident signal transmitted to the transducer element and by sensing a third voltage that is indicative of a reflected signal that is reflected by the transducer element.

4. The method of claim 1, wherein step (a) includes determining a second capacitance of the transducer element at a clamped capacitance frequency by sensing a second voltage that is indicative of an incident signal transmitted to the transducer element and by sensing a third voltage that is indicative of a reflected signal that is reflected by the transducer element.

5. The method of claim 1, wherein step (a) monitors a power delivered to the transducer element at an operating frequency by sensing the current delivered to the transducer element and by sensing a voltage at which the transducer operates.

* * * * *